(12) United States Patent
Mason et al.

(10) Patent No.: US 9,110,147 B1
(45) Date of Patent: Aug. 18, 2015

(54) DIFFERENTIAL EMITTER GEOLOCATION

(71) Applicant: Sandia Corporation, Albuquerque, NM (US)

(72) Inventors: John J. Mason, Albuquerque, NM (US); Louis A. Romero, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 435 days.

(21) Appl. No.: 13/667,594

(22) Filed: Nov. 2, 2012

(51) Int. Cl.
*G01S 3/02* (2006.01)

(52) U.S. Cl.
CPC .......................................... *G01S 3/02* (2013.01)

(58) Field of Classification Search
CPC .................................. G01S 3/02; G01S 19/03
USPC ............................................. 342/465, 357.44
See application file for complete search history.

(56) References Cited

U.S. PATENT DOCUMENTS

2007/0085737 A1* 4/2007 Eslinger et al. .......... 342/357.03
2011/0187598 A1* 8/2011 Dai et al. ...................... 342/451

OTHER PUBLICATIONS

Frodge et al, "Real-Time Centimeter Positioning with GPS: A System Developed by the U.S. Army Corps of Engineers", U.S. Army Topographic Engineering Center, DTIC Session IV IP5, Apr. 1994. 11 pages.
H. O. Hartley, The Modified Gauss-Newton Method for the Fitting of Non-Linear Regression Functions by Least Squares, *Technometrics*, vol. 3, No. 2 (May 1961), pp. 269-280.
P. J. G. Teunissen, "The least-squares ambiguity decorrelation adjustment: a method for fast GPS integer ambiguity estimation", Journal of Geodesy (1995) 70:65-82.
Parkinson et al, "Differential GPS", Global Positioning System: Theory and Applications vol. II, Chapter 1, pp. 3-50, American Institute of Aeronautics and Astronautics, Inc., 1995.

* cited by examiner

*Primary Examiner* — Harry Liu
(74) *Attorney, Agent, or Firm* — Scott B. Stahl

(57) ABSTRACT

An unknown location of a transmitter of interest is determined based on wireless signals transmitted by both the transmitter of interest and a reference transmitter positioned at a known location. The transmitted signals are received at a plurality of non-earthbound platforms each moving in a known manner, and phase measurements for each received signal are used to determine the unknown location.

16 Claims, 2 Drawing Sheets

DIFFERENTIAL EMITTER GEOLOCATION

This invention was developed under Contract DE-AC04-94AL85000 between Sandia Corporation and the U.S. Department of Energy. The U.S. Government has certain rights in this invention.

FIELD

The present work relates generally to geolocation and, more particularly, to geolocating a wireless communication unit based on wireless signal phase measurements.

BACKGROUND

Conventional geolocation techniques can determine an unknown location of a wireless communication unit of interest based on phase measurements of wireless signals received by both the unit of interest and a reference wireless communication unit positioned at a known location.

It is desirable to provide techniques that geolocate a wireless unit of interest based on phase measurements of wireless signals transmitted by both the unit of interest and a reference unit at a known location.

DETAILED DESCRIPTION

Figure 1:
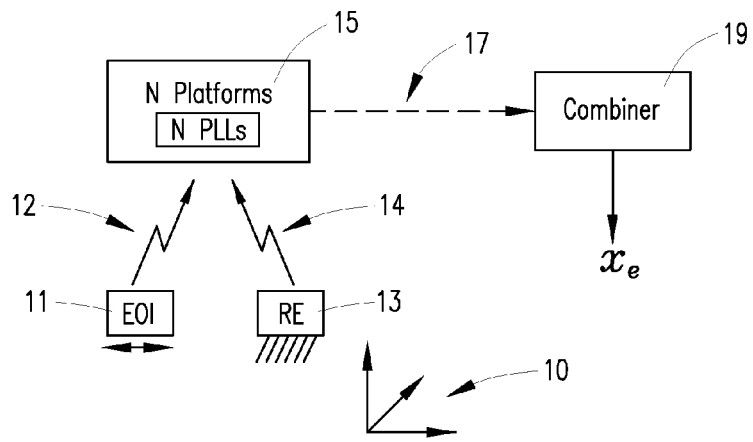
FIG. 1 diagrammatically illustrates a system for geolocating an emitter according to example embodiments of the present work.

Example embodiments of the present work accurately determine the position, or geolocation, of a wireless communication emitter (e.g., a radio frequency (RF) emitter) whose position within a spatial (e.g., Cartesian, polar, etc.) coordinate system is unknown. This emitter is also referred to herein as an emitter of interest (EOI). (The term transmitter is used interchangeably herein with the term emitter.)

A plurality of synchronized wireless receivers are carried, respectively, on a plurality of platforms moving in a known manner relative to the spatial coordinate system. In some embodiments, the platforms are airborne platforms moving in the atmosphere of the earth. In some embodiments, the platforms are satellite platforms moving in space, beyond earth atmosphere. Various embodiments use various combinations of airborne and satellite platforms.

The receivers measure the instantaneous phases of carriers respectively transmitted by the EOI (either moving or stationary) and a reference wireless communication emitter (e.g., an RF emitter), also referred to herein as an RE. The RE is positioned at a known location in the spatial coordinate system. The position of the EOI is determined to be the location that most closely predicts the phase differences (observed at the respective platforms) between the EOI carrier and the RE carrier. A differential clock rate error factor exists between the EOI and the RE. In some embodiments, this factor is treated as a solution variable. In some embodiments, this factor is eliminated by using a further set of differences between the phase difference observed at an arbitrarily chosen reference platform and each of the phase differences observed at the remaining platforms. The so-called integer ambiguity must be resolved in order to obtain the EOI location. Resolution of the integer ambiguity permits determination of the number of wavelengths in the differential paths to a given platform, which in turn permits very accurate (sub-wavelength) relative position accuracy.

The following equation represents the EOI carrier phase received at time epoch $t_0$ at the $n^{th}$ platform (n=1, 2, ... N), whose known location in the spatial coordinate system is $s_n(t_0)$, and whose receiver includes a phase-locked loop (PLL) tracking the EOI's carrier:

$$\varphi_n(t_0) = \frac{\|x_e - s_n(t_0)\|}{\lambda_e} + I_n - L_n \quad (1)$$

Here $\lambda_e$ is the wavelength of the EOI carrier, $I_n$ represents undesired phase contributions from the ionosphere, and $x_e$ is the unknown location of the EOI in the spatial coordinate system. In some embodiments, $\lambda_e$ (or equivalently the center frequency) may not be known accurately enough. In such cases, an initial estimate of the EOI location $x_e$ is used to calculate $\lambda_e$. A platform (e.g., one of the N platforms) makes a frequency-of-arrival (FOA) measurement relative to the EOI carrier using conventional techniques. This FOA measurement, together with the $x_e$ estimate and the known position and velocity of the platform, provide sufficient information with which to calculate an initial estimate of $\lambda_e$ (Refer to the description of FIG. 4 below for further detail.)

The measured phase represented by equation 1 is wrapped, i.e. has a value less than one cycle, and the unknown integer cycles of phase along the propagation path is represented by $L_n$. Ignoring any phase constants introduced by the emitter or receiver (which will be removed by a subsequent differencing operation), equation 1 indicates that the measured fractional phase (in cycles) plus the integral number of cycles is equal to the number of wavelengths in the propagation path plus the ionosphere effects.

A similar equation applies for the RE carrier phase received at the $n^{th}$ platform at time epoch $t_0$:

$$\theta_n(t_0) = \frac{\|x_r - s_n(t_0)\|}{\lambda_r} + I_n - M_n \quad (2)$$

where $\lambda_r$ is the wavelength of the reference emitter, $M_n$ is the unknown integer cycles of phase in the propagation path, and $x_r$ is the known location of the reference emitter in the spatial coordinate system. In some embodiments, $\lambda_r$ may not be known accurately enough. In such cases, $\lambda_r$ is determined by making a FOA measurement relative to the RE carrier at a platform. This FOA measurement is used together with the known RE location $x_r$, and the known position and velocity of the platform, to calculate $\lambda_r$.

Note that equations 1 and 2 assume the same ionosphere effects, which is a justifiable approximation if the emitter locations and carrier wavelengths are not too different between the EOI and RE.

Taking the difference of equations 1 and 2 gives $$\delta_n(t_0) = \frac{\|x_e - s_n(t_0)\|}{\lambda_e} - \frac{\|x_r - s_n(t_0)\|}{\lambda_r} + P_n \quad (3)$$

where n=1, 2, ... N and $P_n = M_n - L_n$. The N differences represented by equation 3 eliminate the ionosphere effects.

Taking a further set of differences will eliminate phase differences due to the aforementioned clock rate error factor. There are N−1 differences in this further set. More specifically, for each of N−1 platforms, there is a difference between equation 3 for that platform, and equation 3 for a further, arbitrarily chosen reference platform. This further set of N−1 differences is represented by N−1 "doubly-differenced" equations of the form $$\Delta_n(t_0) = \quad (4)$$
$$\frac{\|x_e - s_n(t_0)\|}{\lambda_e} - \frac{\|x_r - s_n(t_0)\|}{\lambda_r} - \frac{\|x_e - s_N(t_0)\|}{\lambda_e} + \frac{\|x_r - s_N(t_0)\|}{\lambda_r} + K_n$$

where $K_n = P_n - P_N$, for n=1 to N−1. However, there are still more unknowns than equations, because the N−1 integers, $K_n$, and the 3 spatial coordinate dimension components of $x_e$ are all unknown, for a total of N−1+3=N+2 unknowns.

To obtain more equations than unknowns, the platforms continue to track phase with their PLLs so that measurements such as represented by equations 1 and 2 above are available at additional time epochs. Even a single additional epoch will suffice. If the cycles of phase tracked by the PLLs from $t_0$ to $t_1$ are counted, the following applies with respect to the EOI for n=1 to N:

$$\varphi_n(t_1) = (f_e - f_n)t_1 + \frac{\|x_e - s_n(t_1)\|}{\lambda_e} + I_n - L_n \quad (5)$$

where time has been measured from $t_0$=0, and where $$f_s = \frac{C}{\lambda_s}$$

is the carrier frequency of the EOI and $f_n$ is the frequency that the nth platform converts to baseband.

Similarly for the RE, $$\theta_n(t_1) = (f_r - f_n)t_1 + \frac{\|x_r - s_n(t_1)\|}{\lambda_r} + I_n - M_n \quad (6)$$

where $$f_r = \frac{C}{\lambda_r}$$

is the carrier frequency of the reference emitter. Note that $\phi_n(t_1)$ and $\theta_n(t_1)$ are not wrapped phase measurements like $\phi_n(t_0)$ and $\theta_n(t_0)$, i.e. cycles of phase are counted from epoch $t_0$ to epoch $t_1$. Subtracting equation 6 from equation 5 gives $$\delta_n(t_1) = (f_e - f_r)t_1 + \frac{\|x_e - s_n(t_1)\|}{\lambda_e} - \frac{\|x_r - s_n(t_1)\|}{\lambda_r} + P_n \quad (7)$$

Taking a further set of differences with respect to an arbitrary reference platform gives (similarly to equation 4) doubly-differenced equations at this epoch $t_1$ as $$\Delta_n(t_1) = \quad (8)$$
$$\frac{\|x_e - s_n(t_1)\|}{\lambda_e} - \frac{\|x_r - s_n(t_1)\|}{\lambda_r} - \frac{\|x_e - s_N(t_1)\|}{\lambda_e} + \frac{\|x_r - s_N(t_1)\|}{\lambda_r} + K_n$$

Equations 4 and 8 provide a system of 2N−2 equations in N+2 unknowns. For N≥4, there are at least as many equations as unknowns. Making phase measurements at more time epochs will provide an even more highly overdetermined system. The system provided by equations 4 and 8 may be solved to determine the location $x_e$ of the EOI. In some embodiments, the system is solved in the least-squares sense using the iterative Gauss-Newton procedure. See e.g., 'The Modified Gauss-Newton Method for the Fitting of Non-Linear Regression Functions by Least Squares', H. O. Hartley, Technometrics, Vol. 3, No. 2 (May, 1961), pp. 269-280, incorporated herein by reference. This technique refines an initial guess that could be obtained by estimating emitter position from time or frequency of arrival measurements, or simply using the reference emitter location. This procedure produces a float solution, i.e., where $K_n$ is a floating point solution that approximates the desired integer. In some embodiments, where better accuracy is achievable and desired, the fixed solution is found from the aforementioned float solution using the Lambda Algorithm. See e.g., 'The least squares ambiguity decorrelation adjustment: a method for fast GPS integer ambiguity estimation', P. J. G. Teunissen, Journal of Geodesy (1995), 70:65-82, incorporated herein by reference.

FIG. 1 diagrammatically illustrates a system for geolocating an emitter according to example embodiments of the present work. Reference numerals 11 and 13 respectively designate an EOI and an RE as described above. The example of FIG. 1 shows a Cartesian spatial coordinate system at 10. The EOI 11 and RE 13 transmit their respective carriers at 12 and 14. Reference numeral 15 designates, collectively, N platforms as described above. As mentioned above, each platform has a wireless receiver that receives the carriers 12 and 14. Each of the N receivers has a phase measurement unit that makes phase measurements relative to the carriers 12 and 14 at two (or more) time epochs. In some embodiments, the phase measurement units use respectively associated PLLs (as shown in FIG. 1) to make the phase measurements. The phase measurements are communicated at 17 to a combiner 19 that combines the phase measurements with the known information shown in equations 4 and 8 to determine the unknowns in equations 4 and 8, among which are the three spatial dimension components of the EOI location $x_e$.

Figure 2:
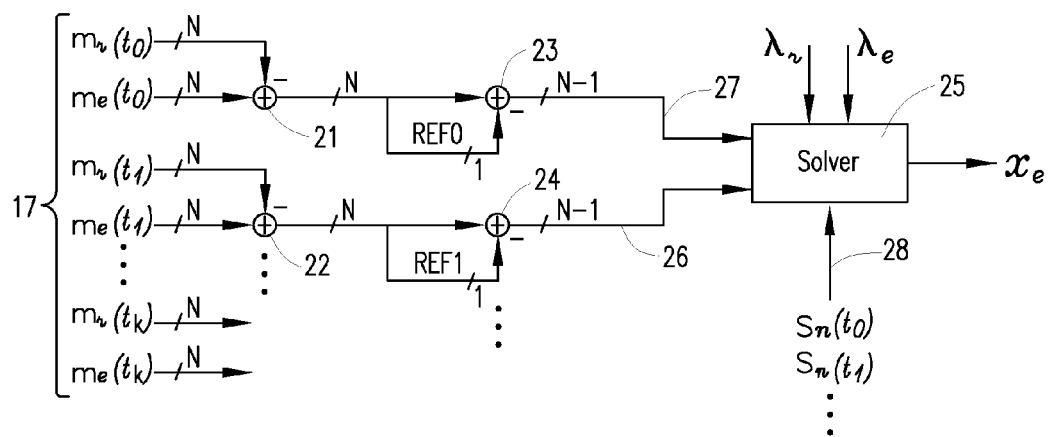
FIG. 2 diagrammatically illustrates details of the combiner of FIG. 1 according to example embodiments of the present work.

FIG. 2 diagrammatically illustrates details of the combiner 19 of FIG. 1 according to example embodiments of the present work. For convenience and clarity in the description of FIG. 2, the phase measurements for the EOI, as represented by the left sides of equations 1 and 5, are respectively designated as $m_e(t_0)$ and $m_e(t_1)$, and the phase measurements for the RE, as represented by the left sides of equations 2 and 6, are respectively designated as $m_r(t_0)$ and $m_r(t_1)$.

As shown in FIG. 2, the two phase measurements from each of the N platforms for epoch $t_0$, $m_e(t_0)$ and $m_r(t_0)$, are input to a difference node 21 that produces a set of N differences corresponding to the left side of equation 3. Similarly, the two phase measurements from each of the N platforms for epoch $t_1$, $m_e(t_1)$ and $m_r(t_1)$, are input to a difference node 22 that produces a set of N differences corresponding to the left side of equation 7.

At a difference node 23, one of the differences (designated REF0) produced by difference node 21 is subtracted from each of the remaining N−1 differences produced by difference node 21, thereby producing at 27 a set of N−1 "double differences" that correspond to the left side of equation 4. Similarly, at a difference node 24, one of the differences (designated REF1) produced by difference node 22 is subtracted from each of the remaining N−1 differences produced by difference node 22, thereby producing at 26 a set of N−1 "double differences" that correspond to the left side of equation 8. The two sets of N−1 "double differences" 26 and 27 are input to a solver 25 that combines the 2N−2 "double differences" with the known information shown in equations 4 and 8, namely, $\lambda_e$, $\lambda_r$, and the position information 28, to solve the aforementioned 2N−2 equations in N+2 unknowns. As indicated above, the solution includes the location $x_e$ of the EOI 11. If $\lambda_e$ and/or $\lambda_r$ are not known accurately enough, either/both may be determined as mentioned above, and as described in more detail relative to FIG. 4.

FIG. 2 also illustrates the general case that uses any desired number of time epochs greater than two. Each of the N platforms thus provides the combiner 19 with more than two sets of measurements: $\{m_r(t_0), m_e(t_0)\}$; $\{m_r(t_1), m_e(t_1)\}$; . . . ; and $\{m_r(t_K), m_e(t_K)\}$.

Referring again to FIG. 1, the communication of the phase measurements at 17 is shown by broken line to indicate the various manners of communication in various embodiments. In some embodiments, the phase measurements are communicated via downlink to a ground station that contains the combiner 19. In some embodiments, the combiner 19 is located on earth but remote from the ground station, and the phase measurements are communicated to the remote combiner electronically or by a suitable portable storage medium. In some embodiments, the phase measurements are communicated to one of the N platforms (or a further platform) that contains the combiner 19.

Figure 3:
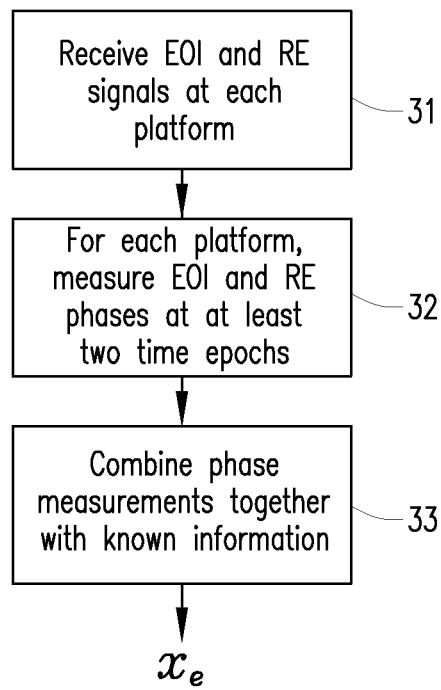
FIG. 3 illustrates operations that may be performed according to example embodiments of the present work.

FIG. 3 illustrates operations that may be performed according to example embodiments of the present work. At 31, the signals from the EOI and RE are received at each of N platforms. For each platform, as shown at 32, the phase of each signal is measured at two or more time epochs. At 33, the phase measurements are combined, together with the known information shown in equations 4 and 8, to determine the three spatial dimension components of the EOI location $x_e$.

Figure 4:
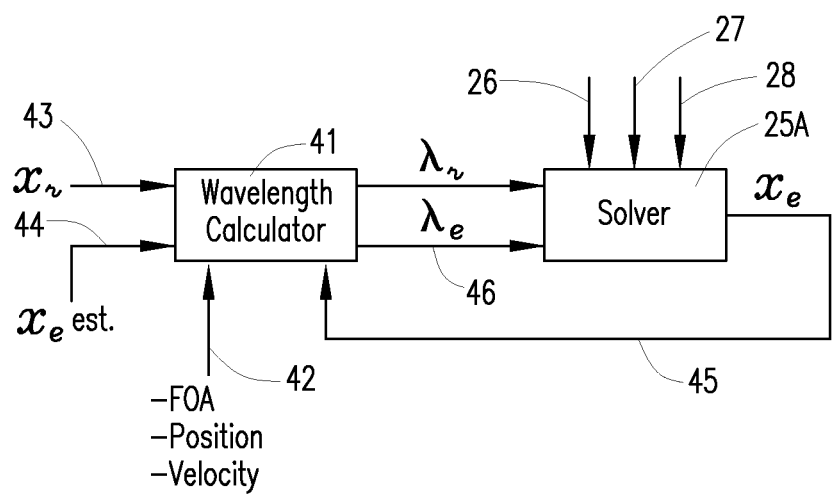
FIG. 4 diagrammatically illustrates details of a combiner for use in the system of FIG. 1 according to further exemplary embodiments of the present work.

FIG. 4 diagrammatically illustrates example embodiments of a combiner for use at 19 in the system of FIG. 1 according to the present work. The combiner of FIG. 4 determines one or both of $\lambda_e$ and $\lambda_r$. As shown, a wavelength calculator 41 receives from a platform (e.g., at 17 in FIG. 1) an FOA measurement (for the EOI and the RE). The wavelength calculator 41 also has access to the platform's position and velocity information, as also shown at 42. The wavelength calculator 41 uses the aforementioned information, together with the RE location $x_r$ (see 43) and/or an initial estimate of the EOI location $x_e$ (see 44), to calculate $\lambda_r$ and/or an initial estimate of $\lambda_e$ (see 46). In some embodiments, the initial estimate of EOI location $x_e$ at 44 is set to the known RE location $x_r$.

The combiner of FIG. 4 includes a solver 25A that is similar to the solver 25 of FIG. 2, but cooperates in iterative fashion with the wavelength calculator 41. In particular, the solver 25A uses the initial estimate of $\lambda_e$ to produce an initial estimate of $x_e$, which is then fed back at 45 to the wavelength calculator 41 for the next iterative calculation of $x_e$ (see 46).

Although example embodiments of the present work are described above in detail, this does not limit the scope of the present work, which can be practiced in a variety of embodiments.

What is claimed is:

1. A method of geolocating a wireless transmitter located on earth, comprising:
    receiving, at a plurality of non-earthbound platforms each moving in a known manner within a spatial coordinate system, a frequency carrier transmitted from a first wireless transmitter whose location within the spatial coordinate system is unknown;
    receiving, at said plurality of platforms, a frequency carrier transmitted from a reference wireless transmitter whose location within the spatial coordinate system is known;
    for each of the received frequency carriers, at each of the platforms, obtaining first and second instantaneous phase measurements at first and second times, respectively;
    for each of the platforms, determining a first difference between the first phase measurement associated with the first transmitter and the first phase measurement associated with the reference transmitter;
    for each of the platforms, determining a second difference between the second phase measurement associated with the first transmitter and the second phase measurement associated with the reference transmitter; and
    using said first and second differences to determine the location of the first transmitter.

2. The method of claim 1, wherein said using includes determining, with respect to one of the platforms, a plurality of third differences, determining, with respect to one of the platforms, a plurality of fourth differences, and using the plurality of third differences and the plurality of fourth differences to determine the location of the first transmitter, wherein each said third difference is a difference between the first difference determined for the associated platform and the first difference determined for a respective one of the other platforms, and wherein each said fourth difference is a difference between the second difference determined for the associated platform and the second difference determined for a respective one of the other platforms.

3. The method of claim 1, wherein each said platform is a satellite platform moving in space beyond earth atmosphere.

4. The method of claim 1, wherein each said platform is an airborne platform moving in earth atmosphere.

5. The method of claim 1, wherein said obtaining includes, for each of the platforms, using an associated phase locked loop to obtain the first and second instantaneous phase measurements at the first and second times, respectively.

6. The method of claim 1, wherein the plurality of platforms includes at least four platforms.

7. The method of claim 1, wherein said obtaining includes obtaining a third instantaneous phase measurement at a third time.

8. The method of claim 1, wherein the frequency carriers are radio frequency (RF) carriers.

9. A system for geolocating a transmitter located on earth, comprising:
    a plurality of non-earthbound platforms each moving in a known manner within a spatial coordinate system, each said platform containing a measurement unit configured to obtain first and second instantaneous phase measurements at first and second times, respectively, for a received frequency carrier transmitted from a first wireless transmitter whose location within the spatial coordinate system is unknown, each said measurement unit further configured to obtain first and second instantaneous phase measurements at said first and second times, respectively, for a received frequency carrier transmitted from a reference wireless transmitter whose location within the spatial coordinate system is known; and a combiner coupled to said platforms and configured to determine, for each of the platforms, a first difference between the first phase measurement associated with the first transmitter and the first phase measurement associated with the reference transmitter, said combiner further configured to determine, for each of the platforms, a second difference between the second phase measurement associated with the first transmitter and the second phase measurement associated with the reference transmitter, and said combiner configured to use said first and second differences to determine the location of the first transmitter.

10. The system of claim 9, wherein said combiner is configured to determine, with respect to one of the platforms, a plurality of third differences, to determine, with respect to one of the platforms, a plurality of fourth differences, and to use the plurality of third differences and the plurality of fourth differences to determine the location of the first transmitter, wherein each said third difference is a difference between the first difference determined for the associated platform and the first difference determined for a respective one of the other platforms, and wherein each said fourth difference is a difference between the second difference determined for the associated platform and the second difference determined for a respective one of the other platforms.

11. The system of claim 9, wherein each said platform is a satellite platform moving in space beyond earth atmosphere.

12. The system of claim 9, wherein each said platform is an airborne platform moving in earth atmosphere.

13. The system of claim 9, wherein each said measurement unit has an associated phase locked loop for obtaining the first and second instantaneous phase measurements at the first and second times, respectively.

14. The system of claim 9, wherein the plurality of platforms includes at least four platforms.

15. The system of claim 9, wherein each said measurement unit is configured to obtain, for each of said carriers, a third instantaneous phase measurement at a third time.

16. The system of claim 9, wherein the frequency carriers are RF carriers.

* * * * *